March 22, 1932.  O. C. TRAUTMANN  1,850,295
PROCESS FOR MAKING TWIN BORE SILICA TUBES
Filed April 19, 1928
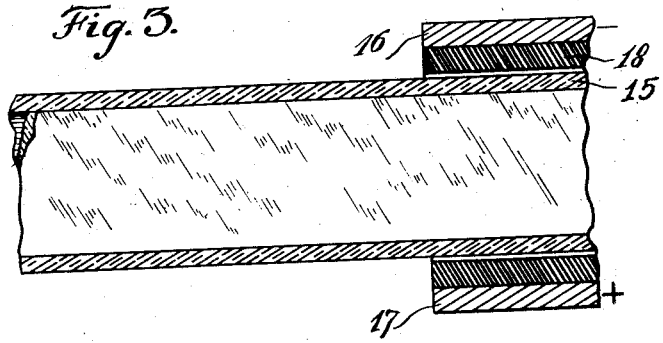
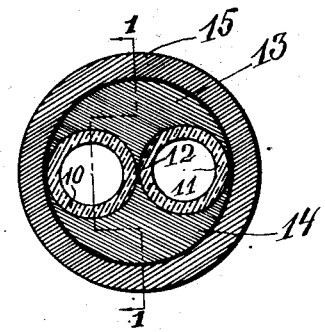
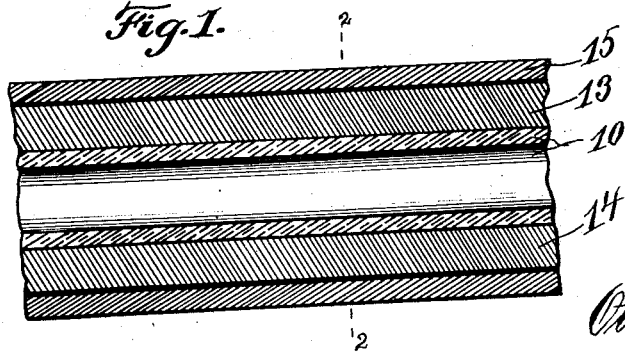
Otto C. Trautmann
INVENTOR
BY
his ATTORNEY Patented Mar. 22, 1932

1,850,295

UNITED STATES PATENT OFFICE

OTTO C. TRAUTMANN, OF NEW YORK, N. Y.

PROCESS FOR MAKING TWIN BORE SILICA TUBES

Application filed April 19, 1928. Serial No. 271,158.

This invention relates to silica tubes and especially to tubes having a twin bore.

Silica tubes of twin bore have various uses in the industrial arts and one of the most modern uses of such twin bore silica tubes is for insulation tubes of electric conductors in the production of radio tubes and for similar purposes. Twin bore silica tubes of a certain kind are already used at present in the radio art but this particular kind of radio tubes is not well suited for this purpose because these tubes are not round but flat, and resemble a flat strip of silica.

In the most important field of the utilization of such twin bore silica tubes all these tubes are surrounded with round metal sleeves which are slipped over their ends and are squeezed tightly upon the silica tube for the purpose of making a tight joint. In view of the great numbers of such tubes needed to satisfy the demand of the market the operation of securing the sleeve to the silica tubes is often done by machinery; the sleeve, being slit longitudinally, is slipped over the tube and is then inserted into a press so as to bring the sleeve into close contact with the silica.

The silica tubes of the prior art have a flat cross section, the width being about 2½ to 3 times that of the height. It stands to reason that the pressure of a machine upon the flat twin bore tube must be rather uneven and is considerably greater from the sides towards the middle than from the top or from below towards the middle. This results in a considerable breakage of these flat silica twin bore tubes and the breakage reaches such an extent that in view of the downward tendency of the prices of the radio tubes the shortcomings of the flat twin bore silica tube in regard to the requirements of both the art and of the market make a round twin bore silica tube highly desirable.

After considerable experiments I have now found a simple and reliable process of making a round twin bore silica tube which answers all requirements in regard to resistance to pressure and is characterized by having both calibers of the tube substantially equal. My new round silica tube allows a better joint between the sleeve and the body of the tube with less expense and it also allows a greater output of the manufactured articles in the production of which it is utilized.

My new invention will be better understood by the description of the process by which I produce my new silica twin bore tube, describing at the same time the mechanical electrical device which I use in the operation of my new process. For the parts of said electrical device I do not make claims except insofar that by the utilization of the assembled parts in their entirety the product of my invention is obtained.

In the accompanying drawings I illustrate an electrical device as I use it at present in the operation of my new process and in said drawings Figure 1 is a vertical longitudinal section along lines 1—1 of Figure 2, and Figure 2 is a vertical sectional view along the lines 2—2 of Figure 1, Figure 3 is a vertical longitudinal section through the center of a heating arrangement showing the outer tube illustrated by Figure 1, but omitting the aggregate arranged therein.

The preparation of my new round twin bore silica tube requires certain preliminary steps. First I weld together two wide round tubes 10 and 11 of fused silica at their point of contact 12 and then I fill up the spaces between them by welding the curved layers 13 and 14 of fused silica to the upper and lower side, respectively of the welded pair of tubes 10 and 11. The arrangement of these wide tubes is rounded off by the addition of the curved layers 13 and 14 and forms an aggregate which already in itself is substantially a wide twin bore tube. Though it would not be necessary, I slip, however, a wider tube 15 over aforesaid aggregate and take care to adjust the diameter of said aggregate in relation to the inside diameter of the wider tube 15 so that the aforesaid aggregate fits as tightly as possible therein to exclude, as far as possible, any air spaces between.

Having thus arranged the component parts in proper relation to each other, I introduce this arrangement into the electric furnace which is illustrated in connection with Figure 3. In said Figure 3 the numerals 16 and 17 denote carbon plates serving as terminals of the positive and negative electrodes, respectively, or a suitable electric circuit, numeral 18 denotes a short cylindrical carbon tube connecting the electrodes 16 and 17. The dimensions of the cylindrical carbon tube 18 are so selected that upon switching in the electric current the cylindrical tube 18 becomes highly incandescent. Inasmuch as the carbon tube 18 is cylindrical, it will be of importance for the best effect of the incandescent heat of the tube 18, to have the component parts in the tube 15 arranged coaxially within the tube 18 so as to have at all points the same distance between the outside wall of tube 15 and the inside wall of tube 18.

As soon as I am convinced that this preliminary condition is fulfilled, I switch in the electric current; in a short time the front end of the tube 15 and of the aggregate therein is highly incandescent. As soon as this stage is reached, the tube 15 and the aggregate, consisting of the tubes 10 and 11 and of the curved layers 13 and 14, fuse homogeneously together and then I draw the front ends of the same out until I obtain a tube of the desired measurements, either in regard to its outside diameter or to that of the inner bore.

In the manner described above I am able to produce a round, fused silica tube having a twin bore, the caliber of each being substantially equal in every respect. The resistance of my round twin bore silica tube against breakage is very far superior to the flat twin bore silica tube of the prior art. My new tube can be made of such diameter as to fit exactly the metallic sleeves provided for radio purposes. My new round silica twin bore tube can be inserted into a press and it stands the pressure evenly in all directions. The manufacturer of radio devices can therefore turn out better goods because a perfect contact between the sleeve and my new round silica tube can be accomplished.

My new round silica twin bore tube can be made exactly one like the other in mass production and therefore the manufacturer of radio tubes does not have continuously to adjust his machinery as he has to do with the flat twin bore silica tubes of the prior art and my new round silica twin bore tube guarantees to the manufacturer the production of greater quantities of conductors, provided with round twin bore silica tubes, at a lower price on account of the great reduction of breakage.

While I have described my new process for the production of my new round twin bore silica tube I beg to state that the invention is not limited to the production exclusively of round tubes, but can be extended to the production of twin bore tubes of any cross section according to the cross section of the tube 15 applied in the process.

What I claim is:

1. The process of making a round fused silica twin bore tube, said process consisting in welding two fused silica tubes longitudinally together, welding a curved layer both to and between the aforesaid joined silica tubes on each side of the same thereby rounding off the aggregate thus obtained, heating one end of said aggregate to a fusing temperature, pulling this fused end in an outward direction, and pushing the other end of the aggregate to the source of heat.

2. The process of making a round fused silica twin bore tube, said process consisting in welding two fused silica tubes longitudinally together, welding a curved layer both to and between the aforesaid joined silica tubes on each side of the same thereby rounding off the aggregate thus obtained, inserting this aggregate into a silica tube, heating one end of this tube and of the aggregate to a fusing temperature, pulling these fused ends in an outward direction, and pushing the other end of said tube and of the aggregate to the source of heat.

In witness whereof, I have hereunto set my hand.

OTTO C. TRAUTMANN.